(12) United States Patent
Hammer et al.

(10) Patent No.: US 9,909,536 B2
(45) Date of Patent: Mar. 6, 2018

(54) GAS VALVE

(71) Applicant: Robert Bosch GmbH, Stuttgart (DE)

(72) Inventors: Uwe Hammer, Kolbermoor (DE); Tobias Riesch, Gaissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/321,746

(22) PCT Filed: May 8, 2015

(86) PCT No.: PCT/EP2015/060170
§ 371 (c)(1),
(2) Date: Dec. 22, 2016

(87) PCT Pub. No.: WO2015/197245
PCT Pub. Date: Dec. 30, 2015

(65) Prior Publication Data
US 2017/0138311 A1 May 18, 2017

(30) Foreign Application Priority Data
Jun. 26, 2014 (DE) .................. 10 2014 212 320

(51) Int. Cl.
*F16K 39/02* (2006.01)
*F02M 21/02* (2006.01)
(Continued)

(52) U.S. Cl.
CPC ..... *F02M 21/0233* (2013.01); *F16K 31/0693* (2013.01); *F16K 39/022* (2013.01); *F16K 41/10* (2013.01)

(58) Field of Classification Search
CPC .............. F02M 21/0233; F16K 39/022; F16K 31/0693; F16K 41/10
(Continued)

(56) References Cited

U.S. PATENT DOCUMENTS 3,084,901 A * 4/1963 Thorburn ............... F16K 31/126
251/282
3,319,649 A * 5/1967 Cummins ............. F16K 39/022
251/129.07
(Continued)

FOREIGN PATENT DOCUMENTS

DE 102009002836 11/2010
DE 102010043641 5/2012
EP 2253827 11/2010

OTHER PUBLICATIONS

International Search Report for Application No. PCT/EP2015/060170 dated Jul. 20, 2015 (English Translation, 3 pages).
(Continued)

*Primary Examiner* — John Bastianelli
(74) *Attorney, Agent, or Firm* — Michael Best & Friedrich LLP

(57) ABSTRACT

A gas valve, in particular a metering valve for a gaseous medium, having a valve washer (10) which is arranged in the gas valve so as to be able to move with respect to a longitudinal axis (8), and having a valve plate (12) with a valve seat (19) formed thereon, wherein the valve washer (10) interacts with the valve seat (19) for opening and closing the gas valve, and having a first circumferential sealing edge (30) between the valve seat (19) and the valve washer (10). The valve washer (10) has a central opening (13) through which the gaseous medium passes, wherein the first circumferential sealing edge (30) surrounds the central opening (13) and wherein, in the central opening (13), there is formed a first pressure face (25) upon which the gaseous medium acts in the closing direction. Furthermore, there is arranged on the valve washer (10) a second pressure face (26) which is formed radially outside the first circumferential sealing edge (30) and on which the gaseous medium also acts. The first pressure face (25) and the second pressure face
(Continued)

(26) are connected via a connection passage (15; 17; 24) formed in the valve plate (12).

15 Claims, 4 Drawing Sheets

(51) Int. Cl.
*F16K 31/06* (2006.01)
*F16K 41/10* (2006.01)

(58) Field of Classification Search
USPC .................... 251/129.07, 282, 335.3, 129.08
See application file for complete search history.

(56) References Cited

U.S. PATENT DOCUMENTS

| 4,848,725 | A | * | 7/1989 | Tibbals, Jr. | ........... | B05B 1/3053 |
| | | | | | | 251/129.07 |
| 5,046,530 | A | * | 9/1991 | Gossner | .............. | F16K 31/0693 |
| | | | | | | 251/282 |
| 6,505,812 | B1 | * | 1/2003 | Anastas | .............. | F16K 31/0693 |
| | | | | | | 251/129.07 |

OTHER PUBLICATIONS

Heffel, J.W., "NOx emission reduction in a hydrogen fueled internal combustion engine at 3000 rpm using exhaust gas recirculation," International Journal of Hydrogen Energy, Elsevier Science Publishers B.V., Barking GB, vol. 28, No. 11, 2003 Nov. 1, pp. 1285-1292.

* cited by examiner

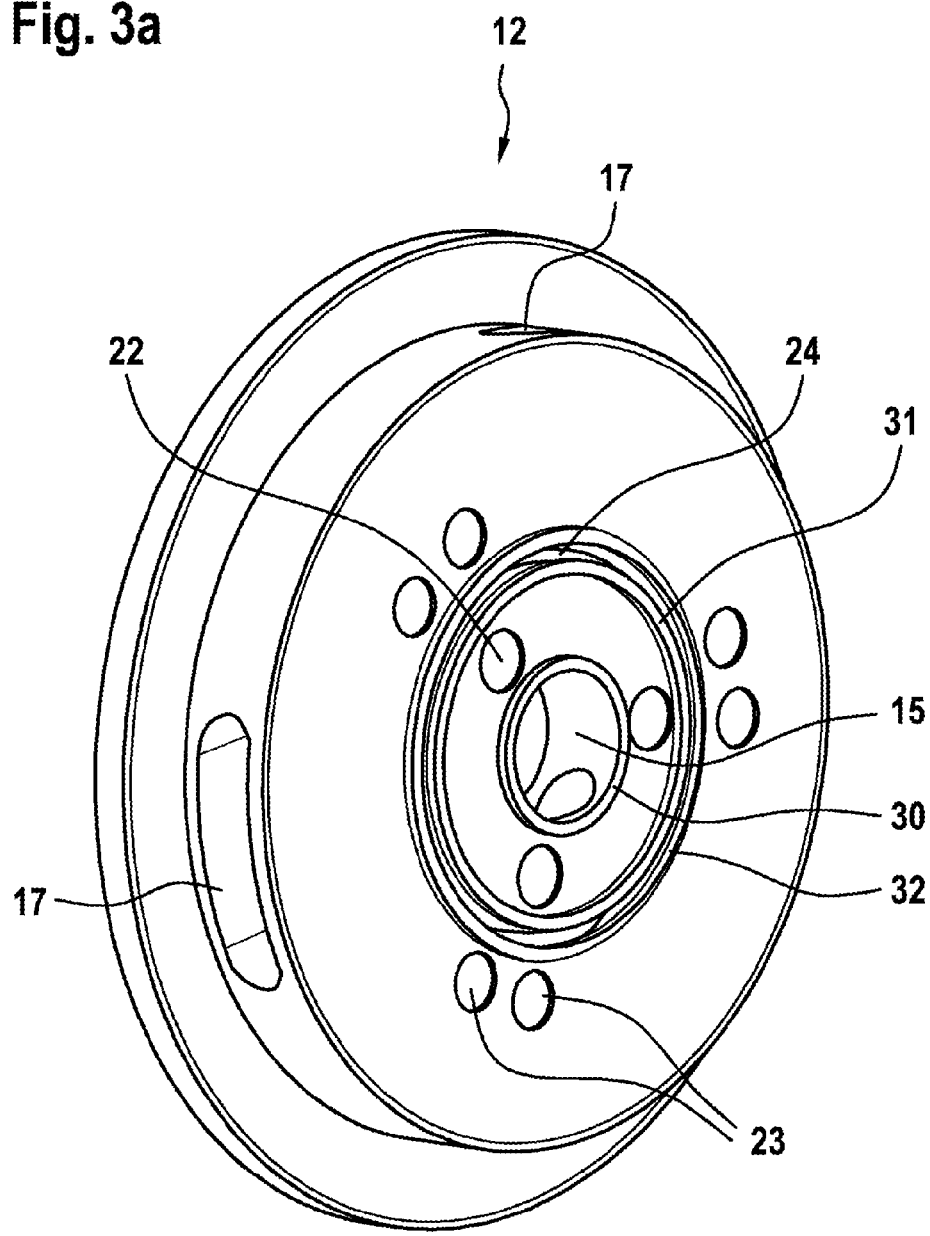

GAS VALVE

BACKGROUND OF THE INVENTION

The invention concerns a gas valve, such as may be used in particular as a metering valve for a gaseous medium.

The invention is based on a gas valve as known for example from publication DE 10 2009 002 836 A1. Such a gas valve is used as a metering valve for a gaseous medium, for example for metering gaseous fuel to be supplied to an internal combustion engine. The known gas valve is here one which is operated electromagnetically and has a valve plate as a sealing element, which is arranged moveably within the gas valve relative to its axis of symmetry. The valve plate cooperates with a valve seat so that when the valve plate lifts away from the valve seat, an inflow cross-section is opened through which the gaseous medium can flow, wherein the metering takes place via the opening duration of the gas valve. The valve plate is moved via the force of an electromagnet which is switched on to open the gas valve and switched off to close the gas valve again, wherein closure of the gas valve takes place via a corresponding closing spring which pressurizes the valve plate.

The gaseous medium to be metered pressurizes the side of the valve plate facing away from the valve seat and leads to a closing force on the valve plate. This closing force must be overcome by the electromagnet which must lift the valve plate away from the valve seat. Since the gas pressure is not always the same, different opening forces are required, which makes it difficult to meter the gaseous medium since the opening force and hence the opening time depend on the gas pressure of the gaseous medium to be metered. In addition, with the known gas valve, the opening cross-section is limited, i.e. the cross-section which is opened by the movement of the valve plate and through which the gaseous medium flows. In particular in gas valves which meter a gaseous fuel in large engines, it is absolutely essential to introduce the necessarily large gas quantity in a metered fashion in as short a time as possible, in order to achieve a high performance of the internal combustion engine.

SUMMARY OF THE INVENTION

The gas valve according to the invention in contrast has the advantage that the forces on the valve plate are at least approximately balanced, i.e. the forces exerted by the gas pressure of the inflowing gaseous medium in the movement direction of the valve plate at least approximately cancel each other out. In addition, the gas valve according to the invention has the advantage that a very large flow cross-section can be opened under control with a relatively small lift of the valve plate, whereby a large inflow cross-section can be opened and closed with short strokes and hence very quickly. For this, the gas valve has a valve disc which is arranged moveably in the gas valve relative to a longitudinal axis and has a central opening for passage of the gaseous medium. The valve disc cooperates with a valve plate to open and close the gas valve, wherein a first circumferential sealing edge is formed between the valve seat and the valve disc and surrounds the central opening, wherein a first pressure face is formed in the central opening which is pressurized in the closing direction by gaseous medium. Furthermore, a second pressure face is formed on the valve disc which is formed radially outside the first circumferential sealing edge and is also pressurized by gaseous medium. A connecting channel is provided which connects the two pressure faces and is formed in the valve plate.

The two pressure faces on the valve disc are opposite each other, so that the forces exerted by the gaseous medium on the pressure faces are directed against each other in the movement direction of the valve disc. The connection created by the connecting channel formed in the valve plate ensures that the same gas pressure is always present on both pressure faces.

In addition, pressurization from two pressure faces on the valve disc creates the possibility of opening and closing a large flow cross-section, since the gaseous medium lies against different points of the valve disc. This opens the possibility of creating an opening cross-section over several seals simultaneously and being able to meter a corresponding large gas quantity.

In a first exemplary embodiment of the invention, the circumferential sealing edge is formed as a web arranged on the valve seat, so that the increased surface pressure creates a secure seal in the region of the central opening.

In a further advantageous embodiment, the gaseous medium flows into the central opening of the valve disc via a flexible supply line. Preferably, this flexible supply line is formed by a bellows which is connected gas-tightly to the valve disc. In this way, all the inflowing gaseous medium can be delivered into the central opening of the valve disc without leakage problems. Bellows can also safely enclose even relatively high gas pressures, so the applicability of the gas valve is ensured even up to higher pressures.

In a further advantageous embodiment, the bellows is arranged pre-compressed and by its pretension exerts a closing force on the valve disc. With a valve disc which is almost completely pressure-balanced, a closing force must be exerted on the valve disc to guarantee closure of the gas valve. For this, an elastic element is required which can advantageously be implemented in the form of the bellows, so no additional components are required.

In a further advantageous embodiment, a second circumferential sealing edge is arranged between the valve seat and the valve disc, radially outside the first circumferential sealing edge, wherein the second pressure face is arranged radially outside the second circumferential sealing edge. The second circumferential sealing edge allows a further flow cross-section to be opened and closed, in order to increase the quantity of gaseous medium which can be metered through the gas valve, which is advantageous in particular for use in internal combustion engines which require a large quantity of gaseous fuel in a short time.

In a further advantageous embodiment, a third circumferential sealing edge is formed between the valve seat and the valve disc, radially outside the second circumferential sealing edge, wherein the second pressure face is formed between the second circumferential sealing edge and the third circumferential sealing edge. This configuration of three, preferably concentric circumferential sealing edges firstly allows the surface pressurized by the gas pressure in the opening direction onto the valve disc to be cleanly delimited, and hence the pneumatic force exerted by the gas on the valve disc in the opening direction. Secondly, the further seal, i.e. the third circumferential sealing edge, allows the provision of a further flow cross-section radially outside on the valve disc, so that the quantity of gaseous medium which can be metered is further increased.

In a further advantageous embodiment, the second circumferential sealing edge or third circumferential sealing edge is formed as a circumferential web on the valve seat. It may also be provided that only one of the two seals is configured as an annular web on the valve seat. By forming the annular web on the valve seat, the valve disc can work with a flat seal, which firstly is easy to produce and secondly can be provided with a coating at low cost, for example with an elastomer.

In a further advantageous embodiment, a central bore is formed in the valve plate which lies opposite the central opening in the valve disc and from which at least one radial bore departs inside the valve plate, via which bore the second pressure face is pressurized with the gaseous medium. It is then particularly advantageous if at least one slot-like opening is formed in the valve plate which is connected to the at least one radial bore and via which the gaseous medium pressurizes the second pressure face, so that the central opening, the radial bore and the slot-like opening form the connecting channel between the first pressure face and the second pressure face. This configuration of the connection between the two pressure faces allows, in simple and reliable fashion, both pressure faces to be pressurized with the gas pressure and hence the force on the valve disc to be equalized. Forming the slot-like openings furthermore allows a large gas quantity to flow out through the slot-like openings when the gas valve is open, so that the quantity which can be supplied is correspondingly high.

In a further advantageous embodiment, a pretensioned closing spring is provided which pressurizes the valve disc with a closing force in the direction of the valve seat. This constitutes an additional or even the only closing force on the valve disc so that this closes reliably.

To move the valve disc, advantageously an electromagnet is provided inside the gas valve which exerts a magnetic opening force on the valve disc when the electromagnet is powered. The valve disc then moves for example against the force of the pretensioned valve spring.

Further advantages and advantageous embodiments of the invention are outlined in the description and in the drawing.

BRIEF DESCRIPTION OF THE DRAWINGS

The drawing shows a gas valve according to the invention in longitudinal section, wherein only the essential parts of the gas valve are shown. The drawing shows.

DETAILED DESCRIPTION

Figure 1:
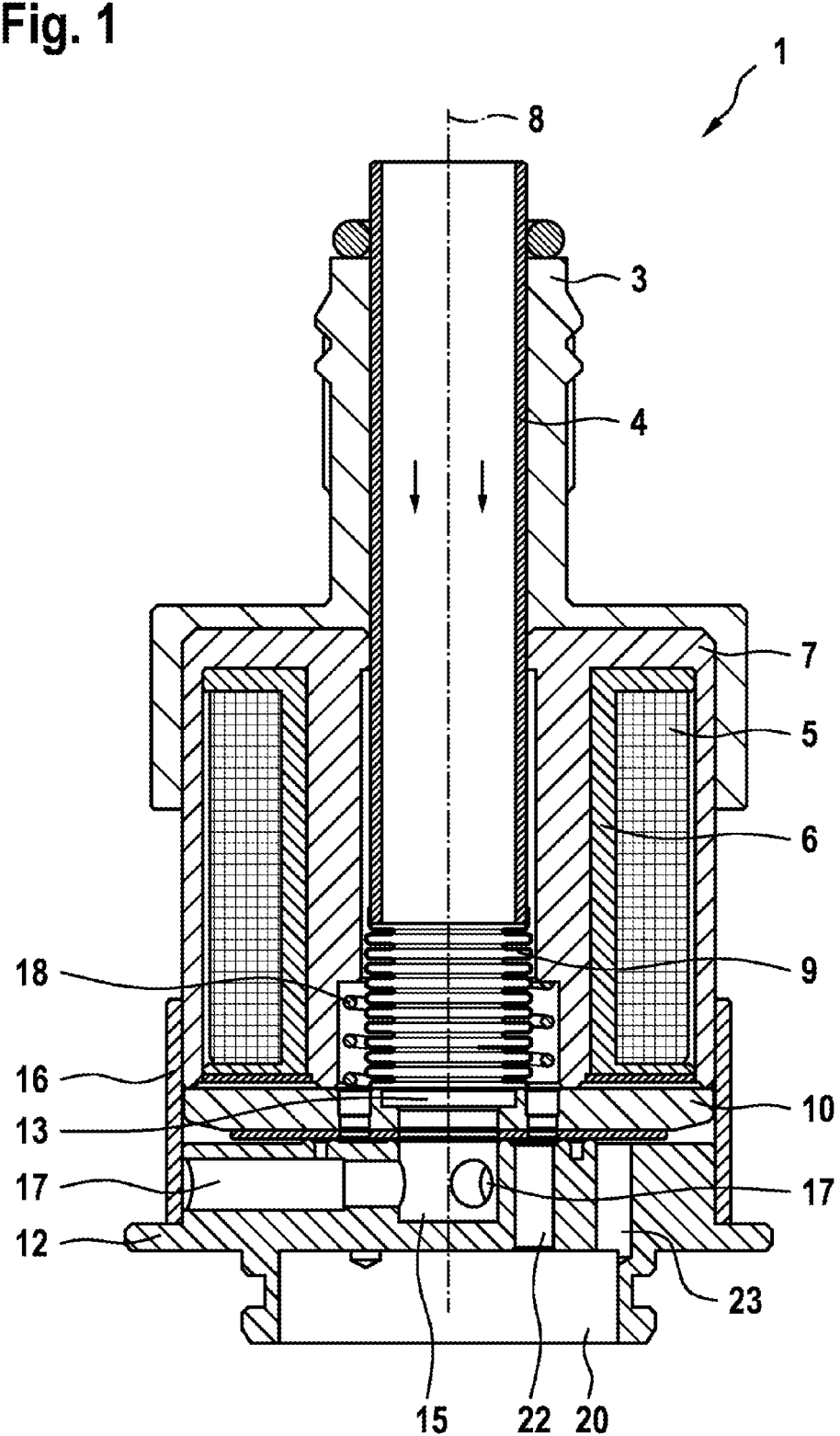
FIG. 1 a longitudinal section through the gas valve according to the invention
Figure 2:
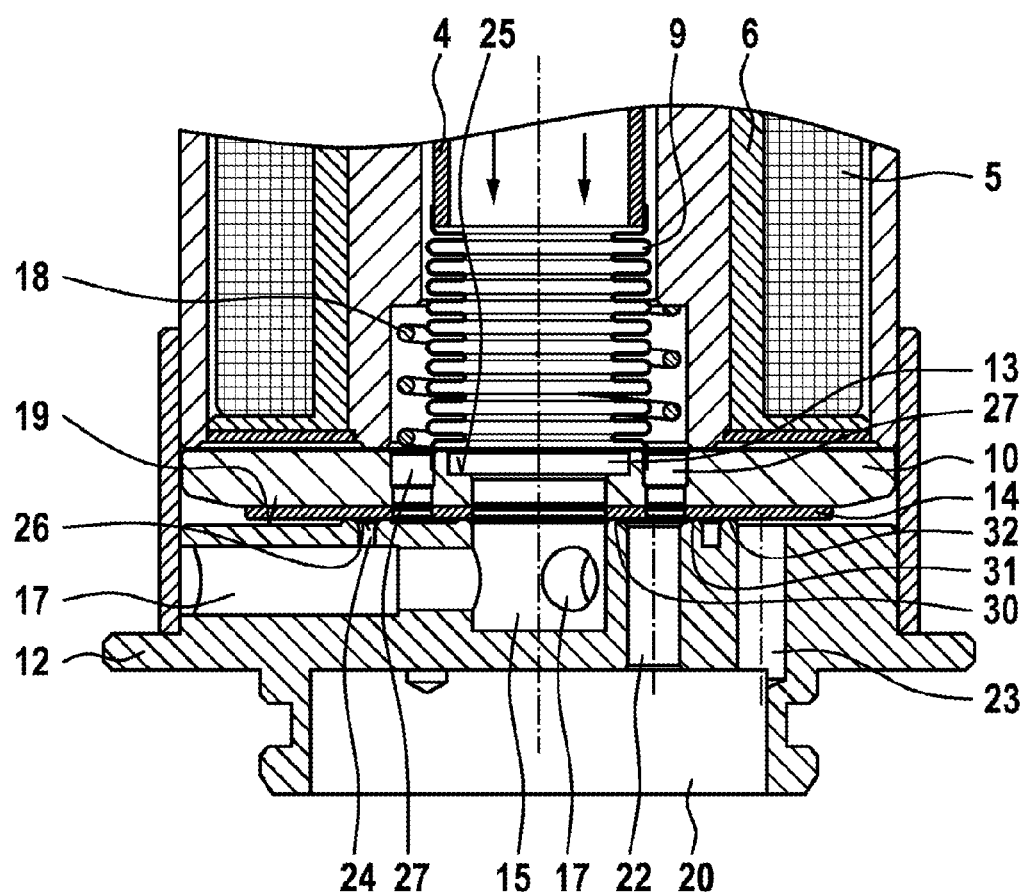
FIG. 2 the same gas valve in enlarged view in the region of the valve plate, and FIGS. 3a and 3b two views of the valve plate of the gas valve shown in FIG. 1 and FIG. 2.

FIG. 1 is a longitudinal section through a gas valve 1 according to the invention in diagrammatic form. The gas valve 1 has a connector 3 which is essentially formed as a stepped cylinder. A sleeve 4 is introduced into the connector 3, via which the gaseous medium to be metered is supplied to the gas valve, wherein the flow direction is marked in FIG. 1 with arrows. At its outlet end, the sleeve 4 transforms into a bellows 9 to which it is connected gas-tightly. Again, at its outlet end, the bellows 9 is connected gas-tightly to a moveable valve disc 10 which is arranged moveably inside the gas valve 1 in relation to its longitudinal axis 8, which also forms the longitudinal axis of the sleeve 4. FIG. 2 shows an enlarged view in the region of the valve disc 10 of FIG. 1.

A central opening 13 is formed in the valve disc 10, wherein the bellows 9 is connected to the valve disc gas-tightly such that the gas flowing through the sleeve 4 and the bellows 9 also flows through the central opening 13 of the valve disc 10. When the gas valve is closed, the valve disc 10 lies on a valve seat 19 which is formed on the side of a valve plate 12 facing the valve disc 10, and forms the outlet end of the gas valve 1. At its lower end facing away from the valve disc 10, the valve plate 12 has an outlet 20 through which the gaseous medium leaving the gas valve 1 flows out of the gas valve 1. A central bore 15 is formed in the valve plate 12 opposite the central opening 13, so that gas which flows through the sleeve 4, bellows 9 and central opening 13 enters the central bore 15 of the valve plate 12. From the central bore 15, three radial bores 17 lead outward and are closed at their outer ends by a sealing sleeve 16 which surrounds the valve plate 12. The sealing sleeve 16 is connected gas-tightly, for example by a weld connection, to the valve plate 12.

The valve disc 10 is moved by means of an electromagnet 5 arranged inside the housing of the gas valve 1 and consisting of a coil 5, a coil carrier 6 and a yoke 7 which surrounds the sleeve 4 and the bellows 9. Powering the electromagnet 5 causes an attraction force to be exerted on the valve disc 10, which moves this away from the valve seat 19 against the pretension of the bellows 9. The closing movement of the valve disc 10 takes place under the elastic force of the bellows or the force of an additional closing spring 18, as shown in FIG. 2. The closing spring surrounds the bellows 9 and acts as an additional or sole closing element on the spring disc 10. In this case, the pretension of the bellows 9 may be omitted or instead of the bellows 9, another elastic element may be used which creates a gas-tight connection between the sleeve 4 and the central opening 13 of the valve disc 10.

A first pressure face 25 is formed in the central opening 13 of the valve disc 10 by a step of the central opening 13. This first pressure face 25 leads to a force in the direction of the valve seat 19 which is exerted by the pressure of the gaseous medium on the valve disc 10. As a counter-force, a second pressure face 26 is provided which is formed on the opposite side of the valve disc 10 and connected via slot-like openings 24 to the radial bores 17, so that via the central opening 13 in the valve disc 10, the central bore 15 and radial bores 17, the gas pressurizes the second pressure face 26. The two faces, i.e. the first pressure face 25 and the second pressure face 26, are at least approximately the same size so that the forces exerted by the gas pressure of the gaseous medium on the valve disc 10 at least approximately cancel each other out.

The valve seat 19 is formed in a structured manner and has a first circumferential sealing edge 30 which surrounds the central opening 13 of the valve disc 10 or the central bore 15 of the valve plate 12, so that when the valve disc 10 lies on the valve seat 19, it is sealed at this point. Similarly, radially outside the first circumferential sealing edge 30, a second circumferential sealing edge 31 and a third circumferential sealing edge 32 are formed on the valve seat 19, wherein the second circumferential sealing edge 31 and the third circumferential sealing edge 32 delimit the second pressure face 26 on the valve disc 10 when the valve disc 10 is resting on the valve plate 19. For a better seal at the circumferential sealing edges 30, 31, 32, a seal 14—for example an elastomer—is applied on the side of the valve disc 10 facing the valve plate 12, so that a reliable seal is achieved at the circumferential sealing edges 30, 31, 32 without a great contact force of the valve disc 10.

To deliver the gaseous fuel, several outlet openings are provided in the valve plate 12. Firstly, inner outlet openings 22 are formed which penetrate the valve plate 12 and are in contact with openings 27 formed in the valve disc 10. Secondly, outer outlet openings 23 are provided which are formed radially outside the inner outlet openings 22 as continuous bores in the valve plate 12, wherein both the inner outlet openings 22 and the outer outlet openings 23 open into the outlet 20 of the valve plate 12.

Figure 3B:
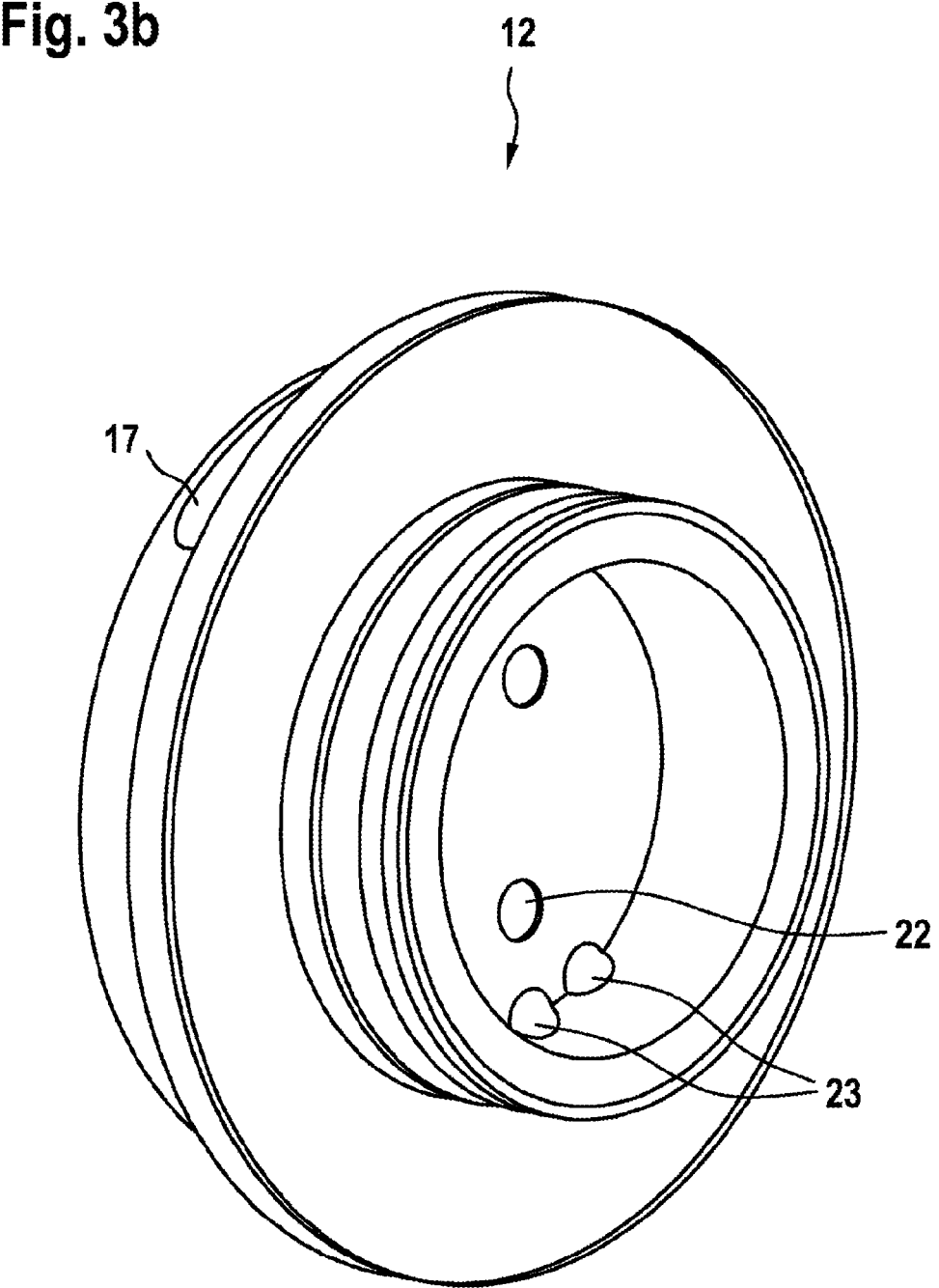

The gas valve functions as follows:

At the start of metering of the gaseous medium, the valve disc 10 is in its closed position, i.e. in contact with the valve seat 19 so that a gas-tight seal is achieved at the first circumferential sealing edge 30, the second circumferential sealing edge 31 and the third circumferential sealing edge 32. The gaseous medium flowing in through the sleeve 4 passes via the bellows 9 into the central opening 13 of the valve disc 10. From there, the gaseous medium flows via the central bore 15 of the valve plate 12 and the radial bores 17 into the slot-like openings 24 of the valve plate 12. The valve disc 10 is pressed either by the force of the pretensioned bellows 9 or by the force of a closing spring 18 against the valve seat 19, wherein it may also be provided that the closing spring 18 is omitted if the necessary closing force can be applied by the bellows 9 alone. When gaseous medium is to be metered, the electromagnet 5 is powered and pulls the valve disc 10 away from the valve seat 19. This opens all three circumferential sealing edges 30, 31, 32 simultaneously so that various flow paths open:

The flow path from the central opening 13 or the central bore 15 via the first circumferential sealing edge 30, radially outwards into the inner outlet openings 22. In the exemplary embodiment shown, three inner outlet openings 22 are provided in the valve plate 12. The gas flows through the inner outlet openings 22 into the outlet 20 of the valve plate 12 and from there reaches its intended destination. For this, FIG. 3*b* shows again the valve plate 12 in a perspective view, wherein FIG. 3*a* shows a view onto the sealing face 19 and FIG. 3*b* the opposite side of the valve plate 12.

A further flow path opens at the second circumferential sealing edge 31, wherein the gas flows through the slot-like openings 24 and then radially inward via the second circumferential sealing edge, and from there also into the inner outlet openings 22.

A further flow path opens starting from the slot-like openings 24, radially outward at the third circumferential sealing edge 32, wherein the gas flowing here flows through the outer outlet openings 23, of which six outlet openings 23 are provided in the valve plate 12 arranged in three pairs, and from there reaches the outlet 20. In this way, a flow cross-section is opened which is substantially formed by the cross-section of the three inner outlet openings 22 and the six outer outlet openings 23.

The number and diameter of the inner outlet openings 22 or outer outlet openings 23 depicted may be varied and adapted to requirements. Thus more or fewer such outlet openings 22, 23 may be provided, and their arrangement may be varied. The number and diameter of these outlet openings 22, 23 also limits the opened flow cross-section at the circumferential sealing edges 30, 31, 32.

So that no additional forces are exerted on the valve disc 10 by the outflowing gaseous medium, openings 27 are provided in the valve disc 10 which are formed in the region in which the closing spring 18 lies on the valve disc 10. These openings 27 serve merely to balance pressure, but also lead to gas pressurization of the bellows 9 on its outside, wherein the pressure in this region is always lower than inside the sleeve 4 through which the gaseous medium is supplied to the gas valve. The space surrounding the bellows 9 and the sleeve 4 is connected gas-tightly, firstly by a weld connection of the sealing sleeve 16 to the yoke 7 of the electromagnet, and secondly by a weld connection or similar gas-tight connection between the yoke 7 and the sleeve 4 at the upper end of the electromagnet 5.

On the side of the valve disc 10 facing the valve seat 19, as already mentioned, a seal 14 may be provided which consists for example of an elastomer. However, other seals are also possible, for example of soft metal such as copper or tin, or the seal 14 may be omitted completely if the gas valve is sufficiently tight without this.

The circumferential sealing edges 30, 31, 32 are formed by webs on the sealing face 19 which are circumferential and annular, as shown in particular in FIG. 3*a*. Instead of the formation of these webs on the sealing face 19, it may also be provided that the sealing face 19 is configured flat and the annular webs are formed on the valve disc 10 and perform the same function. In this case, it may also be provided that a seal is applied to the sealing face 19 which—as already stated—may be made of an elastomer or another soft material.

The invention claimed is:

1. A gas valve with a valve disc (10) which is arranged moveably in the gas valve relative to a longitudinal axis (8), and with a valve plate (12) with valve seat (19) formed thereon, wherein the valve disc (10) cooperates with the valve seat (19) to open and close the gas valve, and with a first circumferential sealing edge (30) on the valve seat (19), the first circumferential edge (30) being engaged by the valve disc (10) when the gas valve is closed, characterized in that the valve disc (10) has a central opening (13) for passage of gaseous medium, wherein the first circumferential sealing edge (30) surrounds the central opening (13) and wherein a first pressure face (25) is formed in the central opening (13), the first pressure face being pressurized in a closing direction by the gaseous medium, and with a second pressure face (26) on the valve disc (10), the second pressure face being formed radially outside the first circumferential sealing edge (30) and being pressurized in an opening direction by the gaseous medium, and with a connecting channel (15; 17; 24) which connects the first pressure face (25) and the second pressure face (26) and is formed in the valve plate (12).

2. The gas valve as claimed in claim 1, characterized in that the circumferential sealing edge (30) is formed as a web arranged on the valve seat (19).

3. The gas valve as claimed in claim 1, characterized in that the gaseous medium flows into the central opening (13) via a flexible supply line (9).

4. The gas valve as claimed in claim 3, characterized in that the flexible supply line is formed by a bellows (9) which is connected gas-tightly to the valve disc (10).

5. The gas valve as claimed in claim 4, characterized in that the bellows (9) is arranged pre-compressed and by its pretension exerts a closing force on the valve disc (10).

6. The gas valve as claimed in claim 1, characterized in that a second circumferential sealing edge (31) is arranged between the valve seat (19) and the valve disc (10), radially outside the first circumferential sealing edge (30), wherein the second pressure face (26) is arranged radially outside the second circumferential sealing edge (31).

7. The gas valve as claimed in claim 6, characterized in that a third circumferential sealing edge (32) is formed between the valve seat (19) and the valve disc (10), radially outside the second circumferential sealing edge (31), wherein the second pressure face (26) is formed between the second circumferential sealing edge (31) and the third circumferential sealing edge (32).

8. The gas valve as claimed in claim 7, characterized in that the second circumferential sealing edge (31) and/or the third circumferential sealing edge (32) are/is formed as a circumferential web on the valve seat (19).

9. The gas valve as claimed in claim 1, further comprising a central bore (15) which is formed in the valve plate (12) which lies opposite the central opening (13) in the valve plate (10) and from which at least one radial bore (17) departs inside the valve plate (12), via which the second pressure face (26) is pressurized with gaseous medium.

10. The gas valve as claimed in claim 9, further comprising at least one slot-like opening (24) which is formed in the valve plate (12), which is connected to the at least one radial bore (17) and via which the gaseous medium pressurizes the second pressure face (26), so that the central opening (15), the radial bore (17) and the slot-like opening (24) form the connecting channel between the first pressure face (25) and the second pressure face (26).

11. The gas valve as claimed in claim 1, characterized in that the forces exerted by the gaseous medium on the first pressure face (25) and the second pressure face (26) at least approximately cancel each other out in the movement direction of the valve disc (10).

12. The gas valve as claimed in claim 1, further comprising a pretensioned closing spring (18) which pressurizes the valve disc (10) with a closing force in the direction of the valve seat (19).

13. The gas valve as claimed in claim 1, further comprising an electromagnet (5, 6) which, when powered, exerts a magnetic opening force on the valve disc (10) and moves valve disc (10) away from the valve seat (19).

14. The gas valve as claimed in claim 1, characterized in that a coating of an elastic material is applied to the valve disc (10) or the valve seat (19).

15. The gas valve as claimed in claim 1, characterized in that a coating of an elastic material is applied to the valve disc (10) or the valve seat (19), wherein the coating is an elastomer.

* * * * *